3,099,647
PROPYLENE POLYMERIZATION CATALYST CONSISTING OF ALUMINUM SESQUIHALIDE, TiCl3 AND TRIETHYLENE DIAMINE
James L. Jezl, Swarthmore, Habet M. Khelghatian, Springfield, and Louise D. Hague, Villanova, Pa., assignors to Sun Oil Company, Philadelphia, Pa., a corporation of New Jersey
No Drawing. Filed Nov. 4, 1960, Ser. No. 67,130
10 Claims. (Cl. 260—93.7)

This invention relates to a novel process for the polymerization of olefins, and more particularly to the polymerization of alpha-olefins having no branching at the 2 position in the presence of a novel three-component catalyst system.

The polymerization of alpha-olefins in the presence of coordination catalysts such as a complex between titanium trichloride or other halides of titanium, vanadium, zirconium, chromium, or molybdenum and aluminum alkyls or alkyl halides such as aluminum triethyl or aluminum diethyl chloride is known. With these catalysts it is possible to obtain solid crystalline polymers in a yield of up to 200 pounds or more of polymer per pound of catalyst. In such polymerization processes it is important that the reaction proceed as rapidly as possible, since if the reaction is slow much larger equipment is required, with attendant increase in capital cost, to produce the same amount of polymer compared to that required at a fast reaction rate. In a typical commercial operation for the production of polypropylene, using a titanium trichloride-aluminum diethyl chloride catalyst at a concentration of titanium trichloride in the reaction mixture of 0.003 pound per gallon, with an aluminum to titanium ratio of 2:1, at 160° F. and at a propylene pressure of 140 p.s.i.g., polypropylene will be formed at a rate of about 0.5 pound per gallon of reaction mixture per hour. Stated in another manner, the polymerization proceeds at the rate of about 66 pounds of polymer per pound of catalyst per hour.

Heretofore it has not been deemed commercially practicable to use as the aluminum component of the catalyst the relatively inexpensive aluminum sesquihalides, which may be readily manufactured by reacting aluminum powder with an alkyl halide, since it has been believed, as pointed out in U.S. Patent No. 2,951,066, the combination of aluminum sesquihalides with transition metal halides will not polymerize propylene and higher alpha-olefins to solid crystalline polymers.

Attempts have been heretofore made to increase the activity of titanium chloride-aluminum sesquihalide catalysts by complexing with other materials. Thus U.S. Patent 2,951,066 to Coover et al. shows titanium trichloride-aluminum sesquichloride catalysts complexed with compounds of VA elements having the formula R3Z, where R is an alkyl radical containing from 1–12 carbon atoms, or phenyl, and Z is the VA element. While their complexes do polymerize olefins to solid polymers, these catalysts are not competitive with catalysts commercially used for polymerization since the rate of reaction, even when the polymerization is conducted in the absence of any inert reaction medium (see Examples 5 through 9) ranges only from 13 to 17 pounds of polymer per pound of catalyst per hour, which is only about one fourth or less of that obtained with the commercial catalyst.

It is the object of this invention to provide a novel catalyst system utilizing the relatively inexpensive aluminum sesquihalides which are comparable in activity to catalysts employing the expensive aluminum diethyl chloride as the aluminum component of the catalyst.

We have found that this object may be obtained by complexing an essentially amorphous titanium trichloride with an aluminum sesquihalide and triethylene diamine, which has the formula:

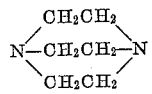

The mol ratio of aluminum sesquihalide, which is considered to have the formula $Al_2R_3X_3$ where R is an alkyl or aryl radical and X is chlorine or bromine, to triethylene diamine should be greater than 1:1 and preferably is from 1.25:1 to 5:1. At ratios lower than 1.25:1 the diamine appears to inhibit the reaction, and at ratios greater than 5:1 the rate of reaction is too slow to be of any practical interest. Preferably the ratio is 2:1. The mol ratio of aluminum sesquihalide to the titanium trichloride should be above 1:5 and may be as great as 10:1, but preferably the ratio is from about .6:1 to about 2:1. Reaction conditions using the catalyst system of the present invention include temperatures of from ambient to 400° F., and pressures from atmospheric to 250 p.s.i.g. or more. Preferably the temperature and pressure are correlated to yield about 30% to 50% olefin in the reaction medium, the other component of which is an inert solvent for the olefin, preferably a saturated hydrocarbon fraction.

The essentially amorphous titanium trichloride useful in the practice of the invention may be prepared by reducing titanium tetrachloride by reaction with aluminum or hydrogen to produce a titanium trichloride which exhibits a crystalline structure under X-ray. This crystalline form of titanium trichloride is then physically treated, as by ball milling or rod milling, until substantially all the crystalline structure has been destroyed. By this we mean that the X-ray diffraction intensity has been reduced to 10% or less of that observed with the untreated titanium trichloride. Unlike crystalline titanium trichloride, this form of titanium trichloride in combination with aluminum sesquihalides will polymerize alpha-olefins to solid polymers, but the rate of polymerization is so slow that the use of this catalyst system is commercially impracticable. Aluminum sesquihalides useful as catalyst components include aluminum ethyl sesquichloride, aluminum ethyl sesquibromide, aluminum ethyl sesquiiodide, and the propyl, butyl, amyl, hexyl and phenyl analogues thereof.

In order that those skilled in the art may more fully understand the nature of our invention and the method of carrying it out, the following examples are given. In all examples heptane is used as the solvent, the olefin is propylene, temperature is 160° F., pressure is 140 p.s.i.g., and the catalyst is used in an amount such as to yield .035 gram of $TiCl_3$ per 100 cc. of the solvent. In all examples the $TiCl_3$ was prepared by reduction of $TiCl_4$ with aluminum, followed by milling until the $TiCl_3$ exhibited an essentially amorphous structure by X-ray analysis.

*Example I*

The catalyst is aluminum ethyl sesquichloride and titanium trichloride in a 1:1 molar ratio. Polymerization is carried out under the foregoing conditions for a period of 240 minutes, after which the catalyst is deactivated by the addition of methanol, and the contents of the reactor are removed. Solid polypropylene, insoluble in boiling pentane, is recovered from the reaction mixture, in an amount indicating that the rate of polymerization is about 7 pounds of polymer per pound of catalyst per hour. The catalyst weight is considered as being the total weight of all the catalyst components present in the reaction mixture. This rate is far too low to be of any commercial significance.

*Example II*

The procedure of Example I is followed, using as the catalyst aluminum ethyl sesquichloride, titanium trichloride, and triethylene diamine in a 1:1:0.5 molar ratio. The rate of polymerization is 55 pounds of polypropylene per pound of catalyst per hour, which is commercially acceptable.

*Example III*

The procedure of Example II is followed, except that the mol ratio of the catalyst components is 1:1:0.25. The polymerization rate is 40 pounds of polymer per pound of catalyst per hour.

*Example IV*

The procedure of Example II is followed, except that the mol ratio of the catalyst components is 1:1:0.75. The rate of polymerization is 50 pounds of polymer per pound of catalyst per hour.

*Example V*

The procedure of Example II is followed, except that the sesquihalide is aluminum ethyl sesquibromide. A polymerization rate of 48 pounds of polymer per pound of catalyst per hour is obtained.

Rates approximating that obtained in Example II are also obtained when aluminum propyl sesquichloride, aluminum isobutyl sesquichloride, or aluminum phenyl sesquichloride is used as the sesquihalide component of the catalyst.

We have further found that while commercially attractive rates of polymerization can be obtained with our novel three-component catalyst system above, the rate may be substantially increased by conducting the polymerization in the presence of hydrogen. Only a very small amount of hydrogen need be present during the polymerization to obtain substantially increased rates. An amount as low as 5 parts per million by weight, based on the weight of the solvent, will increase the rate substantially. Greater amounts may be used, up to 250 parts per million, without materially affecting the rate when over 20 parts per million are used. The following examples illustrate the effect of hydrogen.

*Example VI*

The procedure of Example II is followed except that the polymerization is carried out in the presence of 8 p.p.m. by weight of hydrogen, based on the weight of the solvent. The polymerization rate is 75 pounds of polymer per pound of catalyst per hour.

*Example VII*

The procedure off Example VI is followed, increasing the hydrogen to 22 p.p.m. The rate is 91 pounds of polymer per pound of catalyst per hour. At hydrogen levels of 55 p.p.m. and 88 p.p.m. the rate is approximately the same as at 22 p.p.m.

While the foregoing examples are limited to the polymerization of propylene, any alpha-olefin having from 2 to 20 carbon atoms, and free from branching at the 2 position, may be polymerized to solid polymers useful in the manufacture of films, fibers, and shaped articles For example, 4-methylpentene-1, butene-1, hexene-1, heptene-1, octene-1, octadecene-1, and ethylene may be used as the monomer to be polymerized.

The invention claimed is:

1. A process for the polymerization of olefins which comprises contacting, at a temperature of from ambient to 400° F., and at a pressure of from atmospheric to 250 p.s.i.g., a solution, in an inert hydrocarbon solvent, of an alpha-olefin having from 2 to 20 carbon atoms and free of branching at the 2 position with a catalyst consisting essentially of an essentially amorphous titanium trichloride, an aluminum sesquihalide selected from the group consisting of alkyl and phenyl sesquichlorides and sesquibromides, and triethylene diamine, the mol ratio of aluminum sesquihalide to triethylene diamine being from 1.25:1 to 5:1, and the mol ratio of aluminum sesquihalide to titanium trichloride being from 1:5 to 10:1.

2. The process according to claim 1 in which the olefin is propylene.

3. The process according to claim 2 in which the aluminum sesquihalide is aluminum ethyl sesquichloride.

4. The process according to claim 2 in which the mol ratio of aluminum sesquihalide to metal halide is from .6:1 to 2:1.

5. The process according to claim 1 in which the polymerization is carried out in the presence of from 5 to 250 parts per million by weight of hydrogen, based on the weight of the solvent.

6. The process according to claim 2 in which the polymerization is carried out in the presence of from 5 to 250 parts per million by weight of hydrogen, based on the weight of the solvent.

7. The process according to claim 5 in which the olefin is propylene.

8. A catalyst composition consisting essentially of an essentially amorphous titanium trichloride, an aluminum sesquihalide selected from the group consisting of alkyl and phenyl sesquichlorides and sesquibromides, and triethylene diamine, wherein the mol ratio of aluminum sesquihalide to triethylene diamine is from 1.25:1 to 5:1, and the mol ratio of aluminum sesquihalide to titanium trichloride is from 1:5 to 10:1.

9. The catalyst composition according to claim 8 in which the aluminum sesquihalide is aluminum ethyl sesquichloride.

10. The catalyst composition according to claim 8 in which the ratio of aluminum sesquihalide to titanium trichloride is from .6:1 to 2:1.

References Cited in the file of this patent

UNITED STATES PATENTS

| | | |
|---|---|---|
| 2,932,633 | Juveland et al. | Apr. 12, 1960 |
| 3,001,976 | Langer et al. | Sept. 26, 1961 |

FOREIGN PATENTS

| | | |
|---|---|---|
| 809,717 | Great Britain | Mar. 4, 1959 |